United States Patent
Morgan et al.

(10) Patent No.: US 11,282,322 B2
(45) Date of Patent: Mar. 22, 2022

(54) SYSTEM FOR WEAR AND AGING EVALUATION OF A PAPER-BASED RESOURCE

(71) Applicant: BANK OF AMERICA CORPORATION, Charlotte, NC (US)

(72) Inventors: Rebecca Stepp Morgan, Charlottesville, VA (US); Chad Ryan Compton, Valley Park, MO (US); Ivan Ettore Richmond, Edmonds, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 470 days.

(21) Appl. No.: 16/400,867

(22) Filed: May 1, 2019

(65) Prior Publication Data

US 2020/0349792 A1 Nov. 5, 2020

(51) Int. Cl.
*B65H 29/62* (2006.01)
*G07D 7/181* (2016.01)
*G01N 21/89* (2006.01)
*B65H 43/04* (2006.01)

(52) U.S. Cl.
CPC ............. *G07D 7/181* (2017.05); *B65H 29/62* (2013.01); *B65H 43/04* (2013.01); *G01N 21/8914* (2013.01); *G01N 2021/8917* (2013.01); *G07D 2207/00* (2013.01)

(58) Field of Classification Search
CPC .... G07D 7/181; G07D 2207/00; B65H 29/62; B65H 43/04; G01N 21/8914; G01N 2021/8917
See application file for complete search history.

(56) References Cited

U.S. PATENT DOCUMENTS

| | | |
|---|---|---|
| 6,523,742 B1 | 2/2003 | Awatsu et al. |
| 6,913,260 B2 * | 7/2005 | Maier ................. G07D 11/50 |
| | | 271/265.04 |
| 7,028,888 B2 | 4/2006 | Laskowski |
| 7,347,358 B2 | 3/2008 | Ireland et al. |
| 7,433,844 B2 | 10/2008 | Laskowski |
| 7,903,863 B2 | 3/2011 | Jones et al. |
| 7,929,749 B1 | 4/2011 | Jones et al. |
| 7,978,899 B2 | 7/2011 | Jenrick et al. |
| 8,011,581 B1 | 9/2011 | Folk et al. |
| 8,162,125 B1 | 4/2012 | Csulits et al. |
| 8,177,132 B1 | 5/2012 | Bohen et al. |
| 8,417,017 B1 | 4/2013 | Beutel et al. |

(Continued)

*Primary Examiner* — Howard J Sanders
(74) *Attorney, Agent, or Firm* — Moore & Van Allen PLLC; Vaidehi Bachoti

(57) ABSTRACT

A system for wear and aging evaluation of a paper-based resource described herein is structured for determining a fitness state of a physical body structure of a paper resource item and for adaptive processing of the paper resource item in accordance with the fitness state. Specifically, the system comprises an item transfer unit configured to receive one or more paper resource items and a scanning device structured to retrieve a fitness state of a paper resource item from a physical state sensing component of the paper resource item. The system is structured to adaptively process the paper resource item based on determining whether (i) a wear level and (ii) an item age level of the paper resource item are associated with either a fit item type or an unfit item type.

18 Claims, 6 Drawing Sheets

(56) References Cited

U.S. PATENT DOCUMENTS

| | | |
|---|---|---|
| 8,527,412 B1 | 9/2013 | Waldron, III et al. |
| 8,556,166 B1 | 10/2013 | Folk et al. |
| 8,559,694 B2 | 10/2013 | Jenrick et al. |
| 8,756,158 B2 | 6/2014 | Colvin et al. |
| 8,792,090 B2 * | 7/2014 | Woodford .............. G07D 7/181 356/71 |
| 8,961,702 B2 * | 2/2015 | Lawandy ........... B01D 11/0203 134/31 |
| 2007/0063016 A1 | 3/2007 | Myatt et al. |
| 2007/0228152 A1 | 10/2007 | Washington et al. |
| 2008/0106726 A1 | 5/2008 | Park |
| 2008/0158002 A1 | 7/2008 | Parkinson et al. |
| 2008/0223930 A1 | 9/2008 | Rolland et al. |
| 2009/0132420 A1 | 5/2009 | Silverbrook et al. |
| 2011/0035316 A2 | 2/2011 | Morgan et al. |
| 2012/0008131 A1 | 1/2012 | Jones et al. |
| 2014/0032396 A1 | 1/2014 | Sheng et al. |
| 2015/0117749 A1 | 4/2015 | Smith et al. |

* cited by examiner

SYSTEM FOR WEAR AND AGING EVALUATION OF A PAPER-BASED RESOURCE

FIELD OF THE INVENTION

The present invention is directed to, in general, wear and aging evaluation of paper-based resources. Specifically, the present invention provides novel specialized paper-based items that are structured for wear and age determination. Furthermore, the present invention embraces a novel, proactive approach for adaptively and selectively processing the paper-resources based on the specific fitness of the paper.

BACKGROUND

Use of paper-based items in the form of paper sheets, notes, currency bills, checks, etc. is widespread. These paper-based items, by nature, are subject to inevitable deformation, deterioration, wear, abrasion, etc., in the course of their use and/or due to their age. Moreover, various types of machines operate upon the paper-based items, e.g., for storing, dispensing, printing, scanning, transporting, packaging, bundling, and many other operations associated with the paper-based items. However, typically, the mechanical/physical components of these machines are designed for and compatible with only paper-items of certain fitness characteristics (e.g., wear, age, etc.). Therefore each machine needs to be operated with paper items having compatible fitness characteristics in order to prevent incorrect processing, and blockages, obstructions or even halting of the machine. Moreover in conventional machines, typically, the instance of the incorrect/incompatible fitness paper item being processed cannot be determined until the machine halts/stops due to processing of the incompatible paper item or determination of the incorrect processing only after it has occurred. However, there is no current mechanism for sensing and evaluating wear and aging of paper items, much less systems for transmitting each paper based item to the compatible machine for current processing based on its wear and age characteristics.

Accordingly, there is a need for a novel, proactive system for adaptively and selectively processing the paper-resources based on the specific fitness of the paper, and adaptively and selectively processing the paper-resources based on the specific fitness of the paper. The present invention provides a novel solution to the foregoing shortcomings of conventional systems/machines and provides improvements to technology by employing specialized paper-based items that are structured for wear and age determination. The previous discussion of the background to the invention is provided for illustrative purposes only and is not an acknowledgement or admission that any of the material referred to is or was part of the common general knowledge as at the priority date of the application.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

In one aspect, the present invention is directed to, in general, wear and aging evaluation of a paper-based resource. The system is structured for determining a fitness state of a physical body structure of a paper resource item and for adaptive processing of the paper resource item in accordance with the fitness state. The system typically includes an item transfer unit configured to receive one or more paper resource items, and a scanning device structured to retrieve a fitness state of a paper resource item from a physical state sensing component of the paper resource item. The system further includes at least one processing device operatively coupled to at least one memory device and at least one communication device connected to a distributed network. The system also typically includes a module stored in the at least one memory device comprising executable instructions that when executed cause the processing device and hence the system to perform one or more functions described below.

In one embodiment, the system is configured to: receive, via the item transfer unit, a first paper resource item. Typically, the first paper resource item comprises: a first elongate body structure defining a first surface, an opposing second surface, and a thickness therebetween; and a first physical state sensing component provided at the elongate body structure. Moreover, the system is configured to: scan, via the scanning device, the first paper resource item, wherein scanning the first paper resource item comprises inspecting the first physical state sensing component; determine a fitness state of the first paper resource item based on at least scanning the first paper resource item, wherein the fitness state of the first paper resource item comprises (i) a first item wear level and (ii) a first item age level; in response to at least determining that (i) the first item wear level of the first paper resource item is above a predetermined minimum wear threshold, and (ii) the first item age level of the first paper resource item is below a predetermined age threshold, determine that the first paper resource item is a fit item type; and transmit the first paper resource item to an item processing machine in response to determining that the first paper resource item is the fit item type.

In another embodiment, and in combination with the previous embodiment, determining that the first paper resource item is the fit item type further comprises determining that the first item wear level of the first paper resource item is below a predetermined maximum wear threshold.

In another embodiment, and in combination with any of the previous embodiments, the first surface of the first paper resource item is associated with a first mechanical wear rate. Here, the first physical state sensing component of the first paper resource item comprises an erosion-sensitive component associated with a second mechanical wear rate that is greater than the first mechanical wear rate.

In another embodiment, and in combination with any of the previous embodiments, determining the first item wear level comprises determining a current amount of the erosion-sensitive component. Here, determining that the first item wear level of the first paper resource item is above a predetermined minimum wear threshold comprises determining that the current amount of the erosion-sensitive component is below a predetermined amount associated with the predetermined minimum wear threshold.

In another embodiment, and in combination with any of the previous embodiments, determining the first item wear level comprises determining a current abrasion level of the erosion-sensitive component.

In another embodiment, and in combination with any of the previous embodiments, the first physical state sensing component of the first paper resource item comprises an erosion-sensitive film provided on the first surface of the first paper resource item.

In another embodiment, and in combination with any of the previous embodiments, the first physical state sensing component of the first paper resource item comprises an age tracking component that is structured to automatically change from a first color to a second color after a predetermined period of time, wherein determining the first item age level of the first paper resource item comprises scanning a current color of the age tracking component, wherein determining that the first item age level of the first paper resource item is below the predetermined age threshold comprises determining that the current color of the age tracking component is not the second color.

In another embodiment, and in combination with any of the previous embodiments, the system is configured to construct a second paper resource item. Typically, constructing the second paper resource item comprises: retrieving a second planar body comprising having a first surface, an opposing second surface, and a thickness therebetween; and securing a second physical state sensing component with the planar body (i) at the first surface of the second planar body or (ii) at least partially embedded in the planar body.

In another embodiment, and in combination with any of the previous embodiments, the system is configured to: determine, via the scanning device, a unique identifier associated with the first paper resource item; and construct a data record comprising the unique identifier associated with the first paper resource item and the determined fitness state.

In another embodiment, and in combination with any of the previous embodiments, the predetermined minimum wear threshold is associated with a predetermined newly manufactured paper resource item.

In another embodiment, and in combination with any of the previous embodiments, the system is configured to: modify the fitness state of the first paper resource item to indicate a processing operation, wherein modifying the fitness state comprises performing, via a engraving component, a physical tactile operation on the first physical state sensing component, wherein the physical tactile operation is at least one of (i) a material removal operation, or (ii) a material distortion operation; wherein performing the physical tactile operation on the first physical state sensing component of the of the first paper resource item causes an increase in the first item wear level.

In another embodiment, and in combination with any of the previous embodiments, the system is configured to: receive, via the item transfer unit, a second paper resource item; determining the fitness state of the second paper resource item comprising a second item wear level and a second item age level; in response to determining at least one of (i) a second item wear level of the second paper resource item being above the predetermined maximum wear threshold, and (ii) the second item age level of the second paper resource item being above the predetermined age threshold, determine that the second paper resource item is a unfit item type; and in response to determining that the second paper resource item is the fit item type, initiate removal of the second paper resource item from circulation.

In another embodiment, and in combination with any of the previous embodiments, the first paper resource item is a currency bill.

In another embodiment, and in combination with any of the previous embodiments, the item processing machine is structured to receive an activity request from a user to withdraw one or more items, and in response to authenticating the user, dispensing, via an item transfer component of the item processing machine, the first paper resource item to the user.

In another embodiment, and in combination with any of the previous embodiments, the system is configured to construct a bundle comprising the first paper resource item and a second paper resource item based on determining that the second paper resource item is the fit item type.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
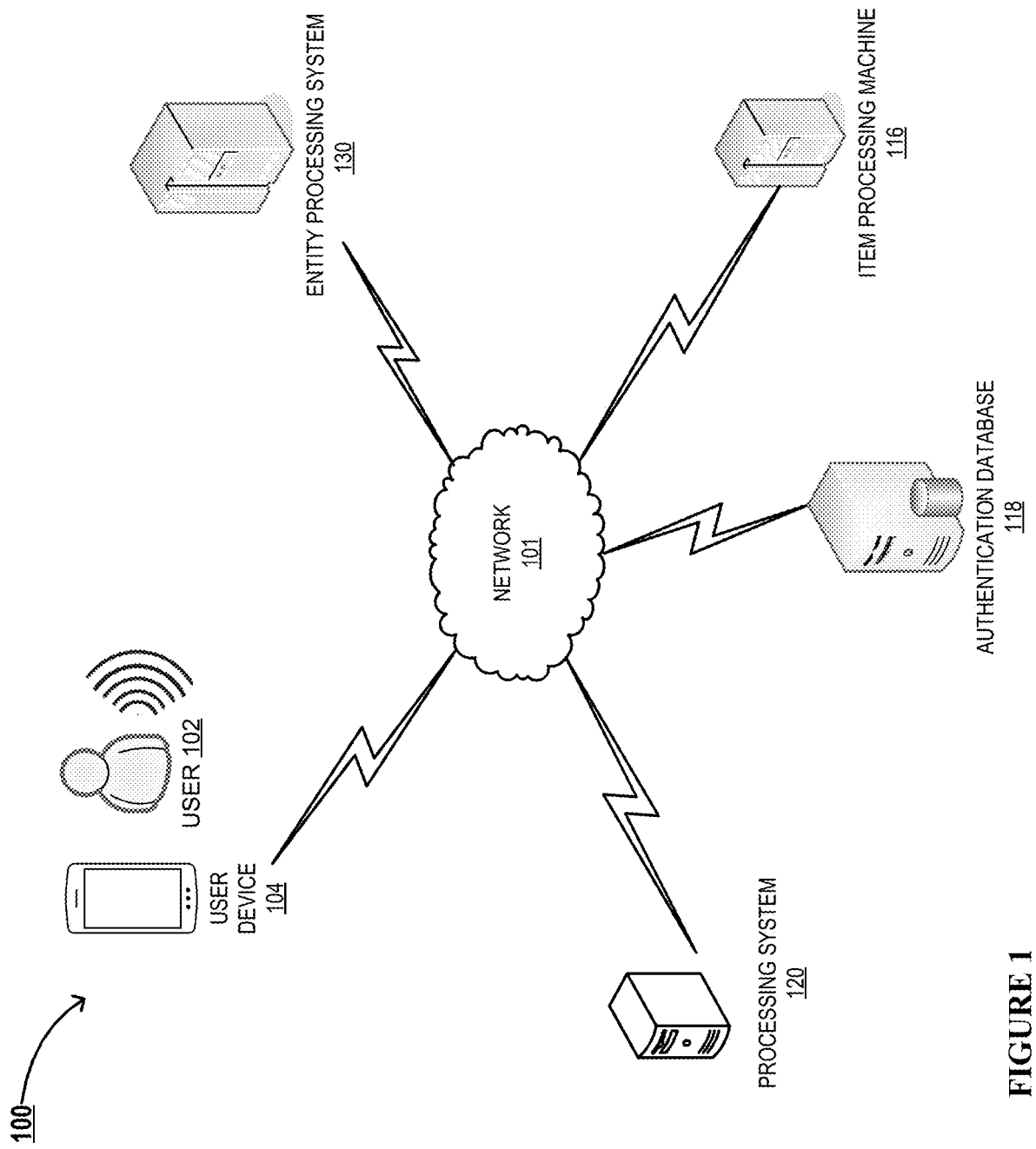
FIG. 1 illustrates a block network architecture diagram illustrating a system environment 100 for wear and aging evaluation of a paper-based resources, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a processing system structured for wear and aging evaluation of a paper-based resources. As such, the entity may be any institution, group, association, financial institution, merchant, establishment, company, union, authority or the like. Typically, the entity is associated with one or more paper resource items and/or one or more item processing machines that are structured to process the paper resource items. Typically, the entity owns, operates, provides, facilitates services associated with, and/or is otherwise associated with the processing system structured for wear and aging evaluation of a paper-based resources, the corresponding entity processing system, and/or one or more item processing machines.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with the processing system for wear and aging evaluation of a paper-based resource, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and devices described herein. In other embodiments, a user may be a system or an entity performing one or more tasks described herein.

An "account" may be the relationship that a user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by an entity. As used herein, an "online banking account" is an account that is associated with one or more user accounts at a financial institution. For example, the user may have an online banking account that is associated with the user's checking account, savings account, investment account, and credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

Many of the embodiments and example implementations thereof described herein are directed toward solving technical problems associated with processing of paper-based items, also referred to as "paper resource items". The "paper resource items", "paper resource items" or "items", in general, typically refer to objects or artifacts that are processed (e.g., by the processing system 120, item processing machine 116 described herein, etc.), such as, cash, currency, currency bills/notes, checks, items associated with a certain value, and the like. In addition to the foregoing, in some embodiments of the invention, the paper resource items or items may refer to other artifacts or objects such as purchase orders, legal documents, certificates, or other items/artifacts that may sought to be securely transported or moved.

Typically, the paper resource items described herein are elongate in structure. "Elongate" or "elongate planar" as used herein typically refers to a generally planar or generally two dimensional body structure whose length and width dimensions are significantly greater than its thickness (e.g., a currency bill, a sheet of paper, a printed receipt, etc.). It is noted that "generally planar" or "generally two dimensional body structure" of the elongate body or elongate planar body encompasses any irregularities such as waves, folds, surface roughness, bumps, markers of wear or deterioration, surface chipping, etc. on the body of the paper resource items, since (i) the dimensions of these irregularities is at least an order magnitude (e.g., magnitude of length) smaller than that of the length and width dimensions of the body and/or (ii) the elongate body or elongate planar body is structured to be in a flattened state when the irregularities are smoothed. An illustrative example of a paper resource item is depicted and described with respect to FIGS. 2C and 2D later on. Moreover, in some embodiments, the paper resource items are flexible. It is noted that, although termed as a "paper resource item" or a "paper based item" it is understood that these paper resource items may be manufactured out of not only paper, but also, other materials such as certain plastics, textiles, composites, organic materials, inorganic materials, metals, alloys, or a suitable combination of the foregoing that typically afford same or similar properties (e.g., flexibility, foldability, lower weight, low thickness, etc.) that paper does.

As discussed previously, use of paper-based items in the form of paper sheets, notes, currency bills, checks, etc. is widespread. These paper-based items, by nature, are subject to inevitable deformation, deterioration, wear, abrasion, etc., in the course of their use and/or due to their age. Moreover, various types of machines operate upon the paper-based items, e.g., for storing, dispensing, printing, scanning, transporting, packaging, bundling, and many other operations associated with the paper-based items. However, typically, the mechanical/physical components of these machines are designed for and compatible with only paper-items of certain fitness characteristics (e.g., wear, age, etc.). Therefore each machine needs to be operated with paper items having compatible fitness characteristics in order to prevent incorrect processing, and blockages, obstructions or even halting of the machine.

For example, in the instances where keeping the paper sheets separate and unstuck is paramount, certain components of particular machines (e.g., rollers, conveying belts, etc. with minimal tolerances) are only compatible with paper items having at least a minimum wear. Paper items that are newly manufactured, typically have very minimal or no wear causing them to stick together and leading to difficulties in separating them for processing each paper item individually. Here, operating these machine components on paper items that are newly manufactured and have minimum wear, may (i) at a minimum cause multiple paper items to be undesirably processed (e.g., dispensed, transported, stored, etc.) together even though they are required to be processed individually, or (ii) at worst, cause blockages, obstructions or even halting of the machine (e.g., because the specific tolerances/allowances of the components are not capable of processing the increased thickness, weight, etc., arising out of processing multiple paper items together. Examples of machines that require processing of paper items individually and separately include ATMs, where each paper item (e.g., currency bill/note, check, etc.) deposited or dispensed needs to be processed individually. Such machines require paper items that (i) have at least a certain amount of wear, because worn items tend to remain separate, but also (ii) do not exhibit severe deterioration due to age and/or wear, because extremely worn/aged items may be un-processable, may fall-apart, etc. In the financial context, a user may wish to deposit paper resource items (e.g., cash or checks) at item processing machine (e.g., an ATM) and have the value of such paper resource items credited to an account, for example, in real-time. In addition, a user may wish to withdraw funds from an account in the form of paper resource items (e.g., cash in the form of currency bills) from an item processing machine (e.g., an ATM).

As another example, in the instances where paper items are required to be bundled together (e.g., for transport purposes), only paper items having minimal wear (e.g., newly manufactured paper items) may be compatible with the associated machines. Here, operating these machine components on paper items that have significant wear may impede the stacking and bundling the items. Such machines require paper items that have minimal wear.

As discussed, in conventional machines, typically, the instance of the incorrect/incompatible fitness paper item being processed cannot be determined until the machine halts/stops due to processing of the incompatible paper item or determination of the incorrect processing only after it has occurred. However, there is no current mechanism for sensing and evaluating wear and aging of paper items, much less systems for transmitting each paper based item to the compatible machine for current processing based on its wear and age characteristics. Moreover, there is no system for determining or correlating a fitness of a paper item with a unique identifier of the paper item.

In order to solve these technical problems, in one aspect, the present invention relates to novel, proactive system for adaptively and selectively processing the paper-resources based on the specific fitness of the paper, and adaptively and selectively processing the paper-resources based on the specific fitness of the paper. In some embodiments, the system provides a specialized paper-based items that are structured for wear and age determination. The features and functions of the invention, as well as the advantages provided will be described now.

Referring to FIG. 1, a block diagram illustrating a system environment 100 configured for wear and aging evaluation of a paper-based resources, is illustrated, in accordance with some embodiments of the invention. As illustrated, the system environment 100 may include a processing system 120, in operative communication with one or more user devices 104 associated with a user 102, an entity processing system 130, an authentication database 118, an item processing machine 116, and/or other systems/devices not illustrated herein, via a network 101. As such, each processing system 120 is typically configured to perform the steps associated with wear and aging evaluation of a paper-based resource described herein either directly (for example, by physically operating the associated components such as item transfer units, scanners, etc.) and/or indirectly by causing other devices in the network to perform the steps by transmitting operative control signals via the network 101.

Typically, the entity processing system 130 and the authentication database 118 are in electronic communication with each processing system 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the processing system 120). In this regard, the wireless communication channel may further comprise near field communication (NFC), communication via radio waves, communication through the internet, communication via electromagnetic waves and the like. In some embodiments, the network 101 may refer to a mechanical/physical network for physically transmitting the paper based items.

The processing system 120 is typically configured for wear and aging evaluation of a paper-based resources. The components of each processing system 120, its features and functions will be described in detail throughout this disclosure and with respect to FIG. 2A, in particular.

As alluded to previously, the entity processing system 130 is typically in operative communication with the processing system 120. In some embodiments, the entity processing system 130 is configured to transmit control instructions that are configured to cause the processing system 120, and/or the user device 104 to perform at least a portion of the steps associated with one or more activities. The entity processing system 130 may be associated with the same entity as the processing system 120 or may be associated with another entity. The structure and components of the entity processing system 130 are described in detail with respect to FIG. 3. The processing system 120 may further communicate with the item processing machine 116 and/or the authentication database 118, either directly or via the entity processing system 130. The authentication database 118 may comprise authentication credentials associated with users requesting or accessing the processing of the paper based resources. The entity processing system 130 and/or the processing system 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. As discussed previously, in some embodiments, the processing system 120 of the present invention is configured to establish operative communication channels with the user device 104 such that, the user 102 may perform one or more user activities, either entirely or in part, at an processing system 120 by interacting with the user device 104. The user device 104 is described in detail with respect to FIG. 4.

Figure 2A:
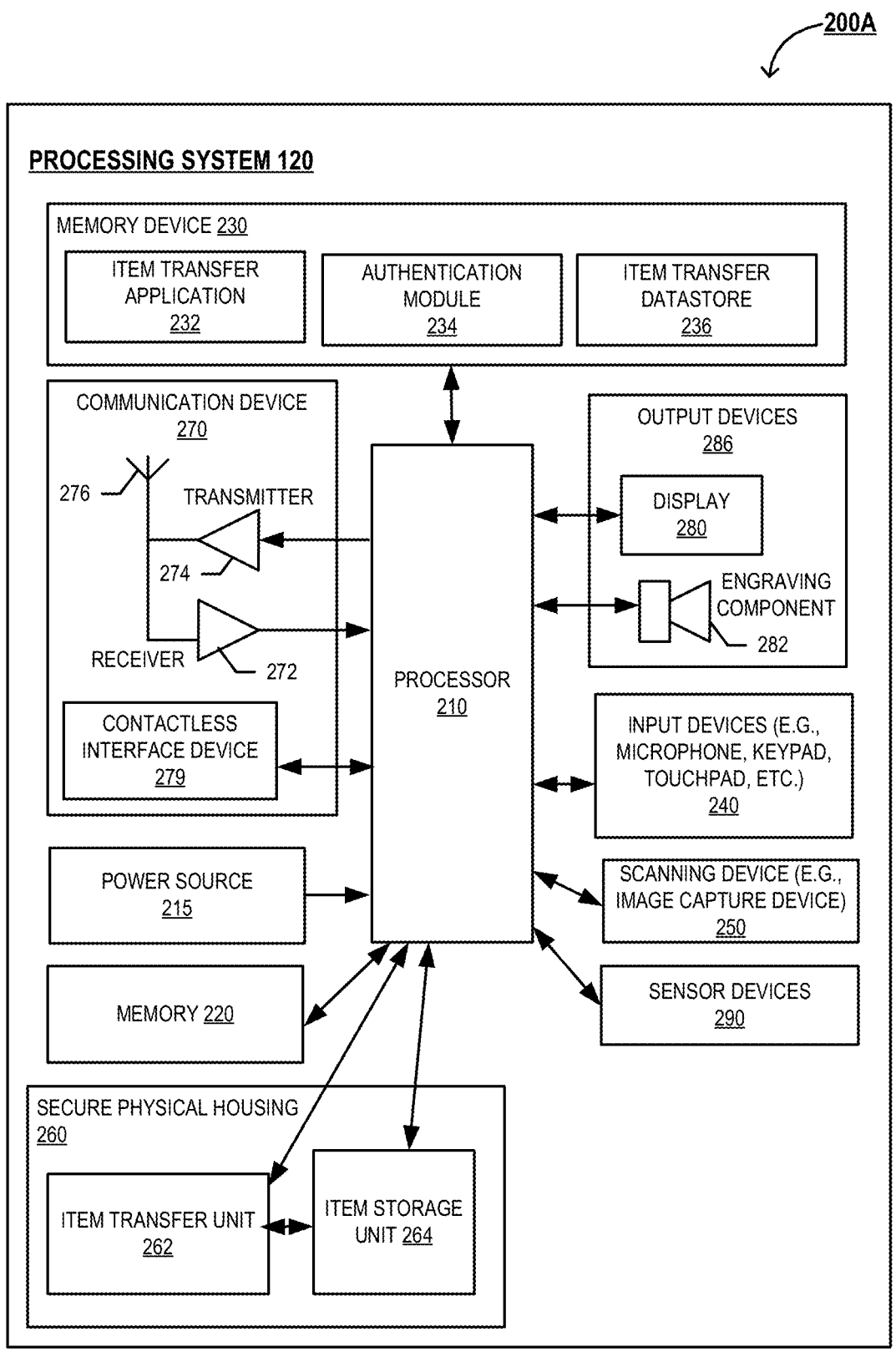
FIG. 2A illustrates a schematic block diagram 200A of a processing system 120 of FIG. 1, in accordance with an embodiment of the invention.

FIG. 2A, illustrates a block diagram 200 of the processing system 120, in accordance with some embodiments of the invention. As discussed previously, the processing system 120 is configured to process paper resource items, for wear and aging evaluation and adaptive processing and routing. The processing system 120 typically includes a processing device or a processor 210 ("at least one processing device"), memory device 230, storage memory 220 ("at least one memory device") or datastore 220, and a communication device 270 ("at least one communication device"). As such, the processing system 120, and the processor 210 is particular, is configured to perform at least a portion of the steps of the embodiments described herein, either based on executing computer readable instructions stored in the memory device 230, by causing other devices and systems (such as the entity system 130) to perform one or more steps described herein, and/or based on receiving instructions, indications, or signals from other systems and devices such as the entity processing system 130, the user device 104, and/or other systems. In other embodiments, the entity processing system 130 is configured to transmit control instructions to, and cause the processor 210 of the processing system 120 to perform one or more steps of the embodiments presented herein.

The processor 210 may generally refer to a device or combination of devices having circuitry used for implementing the communication and/or logic functions of the processing system 120. For example, the processor 210 may include a control unit, a digital signal processor device, a microprocessor device, and various analog-to-digital converters, digital-to-analog converters, and other support circuits and/or combinations of the foregoing. Control and signal processing functions of the processing system 120 may be allocated between these processing devices according to their respective capabilities.

The processing system 120 may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the processing system 120, such as a scanning device 250 (e.g., image capture device), sensor devices 290, an item transfer unit 262, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium comprising executable instructions that when executed by the processor 210, cause the processor to perform one or more functions of the processing system 120. For example, the memory device 230 and/or the storage memory 220 may include any computer memory that provides an actual or virtual space to temporarily or permanently store data and/or commands provided to the processor 210 when it carries out its functions described herein.

As illustrated by FIG. 2A, the memory device 230 typically comprises an item transfer application 232, an authentication module 234, an item transfer application datastore 236 stored therein. In some embodiments, the authentication module 234 is integral with the item transfer application 232. In some embodiments, the item transfer application 232 and/or the authentication module 234 may be executable to initiate, perform, complete, and/or facilitate one or more portions of any embodiment described and/or contemplated herein, either independently or in response to receiving control instructions from the entity processing system 130. In some embodiments, the item transfer application 232 comprises computer readable instructions stored in the memory device 230, which when executed by the processor 210, are configured to cause the processor 210 to perform one or more steps of the embodiments presented herein, and/or cause the processing device to transmit control instructions to other components of the processing system 120 and other devices/systems in the network 101 to cause them to perform the steps. Generally, the item transfer application 232 is executable to receive activity instructions from the user and perform various functions in addition to the specific steps of the embodiments presented herein, as appreciated by those skilled in the art. The item transfer application 232 may be coupled to an item transfer datastore 236 for storing application data as user activities are being performed. The item transfer datastore 236 may store the application data temporarily for the predetermined duration of the execution of the activity (such as a memory buffer, or cache memory), or permanently. In some embodiments, the item transfer datastore 236 includes an inventory of items located in the item storage unit 264.

The processing system 120 may require users to identify and/or authenticate themselves before the processing system 120 may initiate, perform, complete, and/or facilitate a user activity. For example, in some embodiments, the processing system 120 is configured (and/or the item transfer application 232 is executable) to authenticate a user based at least partially on a debit card, smart card, token (e.g., USB token, etc.), username, password, PIN, biometric information, and/or one or more other credentials that the user presents to the processing system 120. Additionally or alternatively, in some embodiments, the processing system 120 is configured to authenticate a user by using one-, two-, or multi-factor authentication. For example, in some embodiments, the processing system 120 requires two-factor authentication, such that the user provides a valid debit card and enter the correct PIN associated with the debit card in order to authenticate the user to the processing system 120. However, either alternatively or in addition to the aforementioned authentication features, the processing system 120 may require biometric authentication of the user 102 before initiating, performing, completing, and/or facilitating a user activity. In some embodiments, these authentication credentials are received at the processing system 120 via input 240 and output 286 devices of the processing system 120. In some embodiments, the authentication credentials are received via a user interface of the user device 104.

In some embodiments, the authentication module 234 comprises computer readable instructions that when executed by the processor 210 cause the processing device to perform one or more functions and/or transmit control instructions to other components or devices (such as the user device 104) to perform one or more authentication steps described herein. These authentication steps typically include requesting authentication credentials from the user via the output devices 286 and/or via user interfaces/output devices of the user device 104 (for example, based on determining the desired authorization level for the user activity), activating pertinent sensors and devices for receipt of the credentials (for example, sensor devices 290/scanning devices 250 for biometric credentials, card reader devices for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, entity processing system 130 and/or database 118), and the like. That said, as shown, the processor 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the processing system 120, between the processing system 120, particularly the processor 210, and other devices or systems, such as the entity processing system 130, the user device 104, the authentication database 118, the item processing machine 116, and the like. In this regard, the communication device 270 typically comprises a transmitter 274, a receiver 272, a broadcasting device 276 to transmit and receive signals from corresponding devices via a suitable transmission medium or a communication channel. In some embodiments, the processing system 120 is configured to be coupled/connected to other devices and systems via wired communication channels. In other embodiments, the processing system 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the processing system 120 may include a transceiver, i.e., one or more antennas and and/or other electronic circuitry, devices, and software, for receiving data when a device is held close to or tapped at a suitable location of the processing system 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the processing system 120 within a distance of up to approximately 25 cm, and from 0-20 cm, such as from 0-15 cm, and 0-10 cm, and the like. Specifically, the communication device may employ NFC channel features described above to operatively communicate with the user device 104.

In some embodiments, the processing system 120 is easily portable and function with wireless communications/connections alone.

Establishing the communication channels may also include signaling information in accordance with the air interface standard of the applicable cellular system of the wireless telephone network that may be part of the network 101. In this regard, the processing system 120 may be configured to operate with one or more air interface standards, communication protocols, modulation types, and access types. By way of illustration, the processing system 120 may be configured to operate in accordance with any of a number of first, second, third, and/or fourth-generation communication protocols and/or the like. For example, the processing system 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The processing system 120 may also be configured to operate in accordance with non-cellular communication mechanisms, such as via a wireless local area network (WLAN) or other communication/data networks.

The user interface of the processing system 120 may include user input devices 240 and user output devices 286, as illustrated by FIG. 2A. The user interface of the processing system 120 is typically configured to facilitate the interactive sessions with the user. The user output devices 286 typically include a display 280 (e.g., a liquid crystal display, a touchscreen display, and/or the like) which is operatively coupled to the processor 210. In some embodiments, where the processing system 120 requests the user's signature (if needed), the display may also serve as a touchpad input device to input the user's signature via a stylus. Other output devices may include one or more an engraving component 282, which may be employed to physically modify the paper item. The output devices 286 including the display 280 typically provide instructions and information to the user, regarding the user activity and steps associated with the processing of the paper resource items. The user interface may include any number of user input devices 240 allowing the processing system 120 to transmit/receive data to/from the user 102, such as a keypad, keyboard, touch-screen, touchpad, card reader, microphone, mouse, joystick, other pointer device, button, soft key, and/or other input device(s). A printer that can print paper receipts, for example, at the completion of a user activity, may also be incorporated into the processing system 120. That said, the processing system 120 may also be configured to transmit electronic receipts to the user. For example, the processing system 120 may transmit an electronic receipt to the user device 104 via a NFC communication channel established using the contactless interface device 279.

The processing system 120 typically includes an item storage unit 264 for storing paper resource items. For example, the paper resource items may include cash (currency bills) and/or checks. The processing system 120 also typically includes an item transfer unit 262. The item transfer unit 262 is typically in operative mechanical/physical and/or electronic communication with the item storage unit 264 and is typically configured to dispense items stored in the item storage unit 264, receive items (e.g., from a user), and store received items in the item storage unit 264. For example, the item transfer unit 262 may include one or more paper item dispensers and deposit mechanisms. The secure physical housing 260, the item transfer unit 262, the item storage unit 264 of the processing system 120 will be described in detail below with respect to FIG. 2B.

As illustrated by FIG. 2A, the processing system 120 may further comprise a scanning device 250 (e.g., image capture device). The scanning device 250 (e.g., image capture device) typically comprises cameras and other audio, video, image capture devices, infrared sensors, optical sensors, strain gauges, etc. The scanning device 250 (e.g., image capture device) may comprise one or more components. In some embodiments, one or more components of the scanning device 250 (e.g., image capture device) may be located within the secure physical housing 260, located on or proximate to an external surface of the secure physical housing 260, within or proximate to walls of the secure physical housing 260, and/or at input and/or output portals of the secure physical housing 260. In some embodiments, the scanning device 250 (e.g., image capture device) is typically configured to capture images of paper items being deposited into the processing system 120 and/or withdrawn from the processing system 120 (for example, in the instances where the device 250 or the components of the device are located within the housing 260 or at the at input and/or output portals of the housing 260). The images captured by the scanning device 250 (e.g., image capture device) may be analyzed by the processing system 120 in order to identify specific items being withdrawn or deposited (e.g., to determine wear, age, unique identifiers, etc.). By identifying specific items being withdrawn or deposited, the processing system 120 may be able to maintain an accurate inventory of items located in the item storage unit 264. In some embodiments, and/or in combination with the above embodiments, the scanning device 250 (e.g., image capture device) is also configured to capture authentication credentials of the user (e.g., by identifying the user for authentication or facial recognition purposes). Here, for instance, one or more components of the image capture device may be located on or proximate to an external surface of the secure physical housing 260.

In some embodiments, the scanning device 250 further comprises sensor devices 290. In some embodiments, the processor 210 communicates with, transmits instructions, and/or receives signals from the sensor devices 290, in real-time for wear and age evaluation of the paper resource items. For example, the sensor devices 290 may include ultrasonic sensors, optical sensors, photoelectric sensors, capacitance sensors, inductive proximity/position sensors, visual capture devices (e.g., image capture device), and the associated transducers, transmitter and modulators.

In some instances, the sensor devices 290 comprise biometric sensors for capturing parameters associated with the user, such as fingerprint scanners, voice recognition sensors, facial recognition sensors, and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 2B:
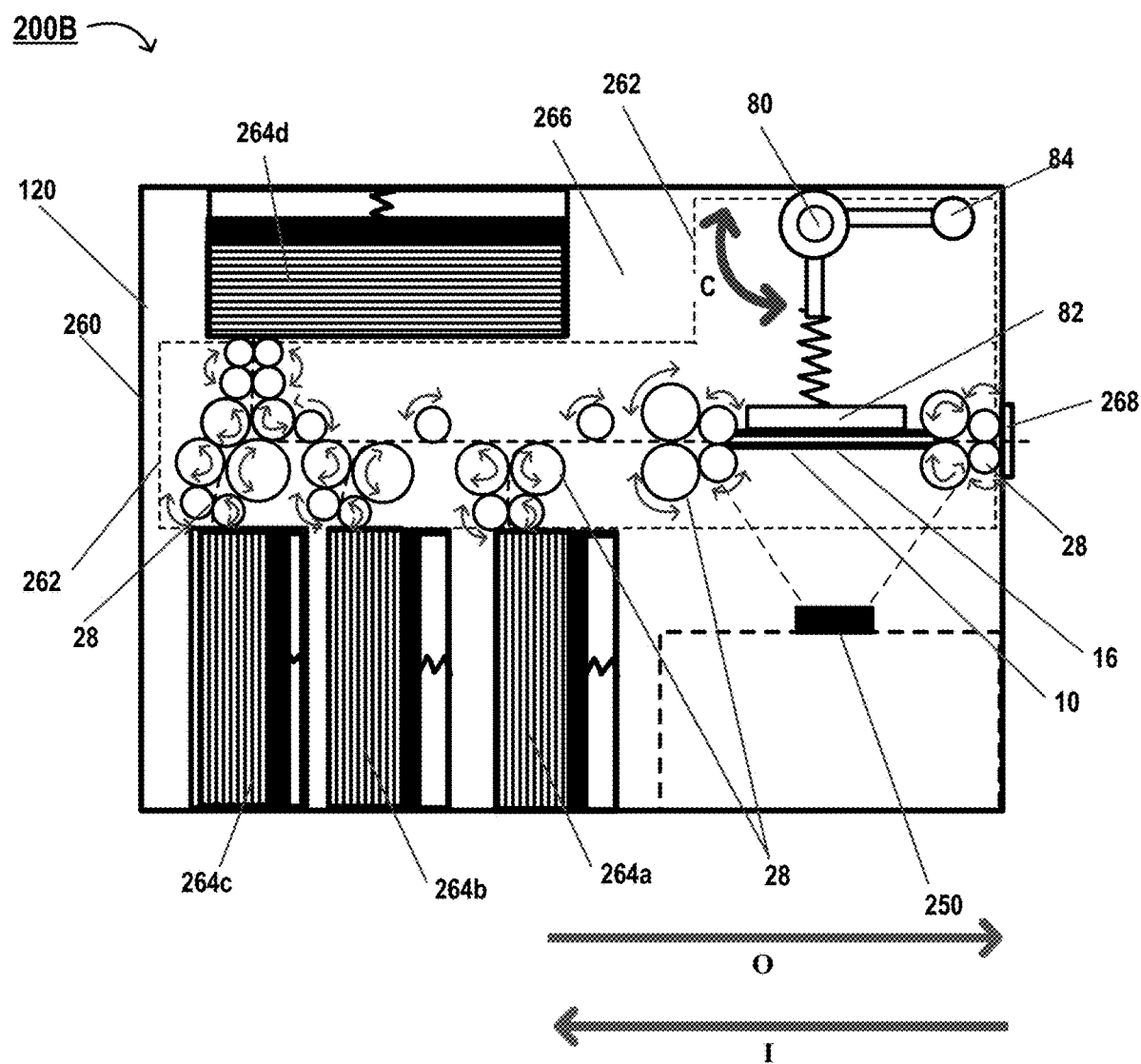
FIG. 2B illustrates a cutaway sectional view of the processing system 120 of FIG. 2A, in accordance with an embodiment of the invention.

FIG. 2B illustrates a cutaway sectional view of the processing system 120, in accordance with some embodiments of the invention. The components, functions and features of the processing system 120 illustrated herein are similar to those described with respect to FIG. 2A. Specifically, FIG. 2B illustrates embodiments of the processing system 120 comprising a secure physical housing 260.

The housing 260 is typically configured for physically separating an interior volume or cavity of housing from the external surroundings. The housing 260 is typically a rigid housing configured to withstand predetermined external stresses and strains and to provide tamper-proof protection for the contents stored in the cavity. In some embodiments, the conduit housing is manufactured from rigid materials that are typically strong enough to withstand predetermined impacts, stresses, strains, wear, buckling and flexure without adversely affecting its structural integrity. As such, the housing 260 may be manufactured out of suitable materials such as metals, alloys, plastics, composites, natural or synthetic materials, polymers and the like, or a combination thereof. Metallic materials may include suitable grades of stainless steel, carbon steels, other ferrous metals and alloys, aluminum and its alloys, tin, lead, and the like. Plastic materials may include polypropylene (PP), polycarbonate (PC), polyvinyl chloride, Low-density polyethylene (LDPE), Polystyrene (PS), Acrylonitrile butadiene styrene (ABS), and the like. Composite materials may include fiber-reinforced plastics, ceramic composites, metal matrices, metal composites, plywood, and the like.

The housing 260 typically encloses the cavity 266. In some embodiments, the housing 260 comprises a security portal or opening (not illustrated). Typically, the security portal is covered by a door with an internal lock, which when unlocked is configured to provide access into the cavity 266. The internal lock is configured such that only authorized personnel or associates of the entity are allowed access into the cavity 266, for example, for the purposes of retrieving paper items, and the like. Typically, the authorized personnel would require to insert a physical key or transmit smart authentication credentials or authorization tokens using a suitable user device/security device to unlock the internal key and retract the door for accessing the cavity 266.

Moreover, the item transfer unit 262 and the item storage unit 264 (comprising a plurality of item storage units (264a-264d)) are typically located in the cavity 266, within the housing 260, as illustrated in FIG. 2B. As discussed previously, the item storage unit 264 is configured to store and manage one or more paper resource items (e.g., cash and/or checks), and the item transfer unit 262 configured to dispense items stored in the item storage unit 264, receive items (e.g., from a user), and store received items in the item storage unit 264. The housing 260 typically includes one or more portals 268 or (e.g., a input portal and an output portal, a combined input/output portal, a check input portal, and/or the like) configured to receive paper resource items into the cavity and the item transfer unit 262 in particular, and/or dispense one or more paper resource items out of the cavity through an opening of the portal. For example, FIG. 2B illustrates, an embodiment of the processing system 120 with a combined input/output portal.

Each item storage unit of the plurality of item storage units (264a-264d) may be associated with or utilized to store paper resource items of a particular fitness state. The particular fitness state of each item storage unit may refer to (i) a particular wear level item wear level, a particular item age level, or a particular combination of the two, and/or (ii) fit type items or unfit type items. For example, the item storage unit 264a may be utilized to store items whose item wear level is above a predetermined minimum wear threshold, and transported for associated fitness-specific processing there on subsequently. For example, the item storage unit 264b may be utilized to store items whose item wear level is above a predetermined minimum wear threshold and whose item age level is below a predetermined age threshold, i.e., fit type items, and transported for associated fitness-specific processing there on subsequently. For example, the item storage unit 264c may be utilized to store items whose item wear level is above a predetermined maximum wear threshold, i.e., unfit type items, and transported for associated fitness-specific processing there on subsequently. For example, the item storage unit 264d may be utilized to store items whose item wear level is below a predetermined maximum wear threshold, and transported for associated fitness-specific processing there on subsequently.

The item transfer unit 262 comprises an item receptacle 16 for temporarily holding items 10 (for example, for holding the item until the scanning and inspecting of the first physical state sensing component is completed by the scanning device 250) and a plurality of roller pairs 28 for transporting the items within the housing 260. The item transfer unit 262 further comprises an item holding device 80 for suitably holding/moving the items from the receptacle 16. The item transfer unit 262 is configured to receive one or more items from a user via the portal 268 along an input direction I, and dispense one or more items via the same portal 268 along an output direction O (e.g., for transport to an item processing machine), typically, based on receiving control signals from the processor 210 (illustrated in FIG. 2A) at the appropriate roller pairs 28 and the item holding device 80.

The functioning of the input mechanism of the item transfer unit 262 will now be described. The user, an item processing machine or another device/system may provide one or more items for storage via the portal 268. For example, the item transfer unit 262 may receive a plurality paper resource items 10, either one after another or together in a randomly ordered stack. The input mechanism may then direct the received items into the receptacle 16 along the input direction I, via the roller pairs 28 nearest the portal 268". Here, the system may employ a first spring biased end 82 of the item holding device 80 to temporarily hold the items until their images are captured. The system may then scan/inspect the topmost item in the input receptacle (i.e., the item most proximate to the scanning device 250 (e.g., image capture device) and away from the first spring biased end 82) using the image capture device, and update an item inventory. The system may then cause rotation of the item holding mechanism 80 along the direction C to cause a second roller end 84 to be positioned proximate the receptacle 16 and to cause the first spring biased end to be positioned away from the receptacle 16. The system may then move the scanned item, via the roller pair 28 and the roller end 84, to an item storage unit associated with the fitness state of the item. In this manner, the system may sequentially scan, record and store all of the paper resource items.

For dispensing the items, the system may a request from an item processing machine to dispense one or more items (for example, 15 items of fit type). The system may then engage the item holding device 80 such that the first spring biased end 82 is proximate the receptacle 16. Next, the system may move the user requested items from the corresponding item storage unit 264b in the output direction O, either sequentially or in groups, and place them in the receptacle 16. Here, the system may also scan/inspect the items using the scanning device 250 (e.g., image capture device) again to ensure that the items match the request. Once all the user requested items have been gathered/placed in the receptacle 16 and the item inventory has been updated, the system may rotate the item holding device such that the second roller end 84 engages the items in receptacle 16 and subsequently dispense the user requested items from the portal 268.

Figure 2C:
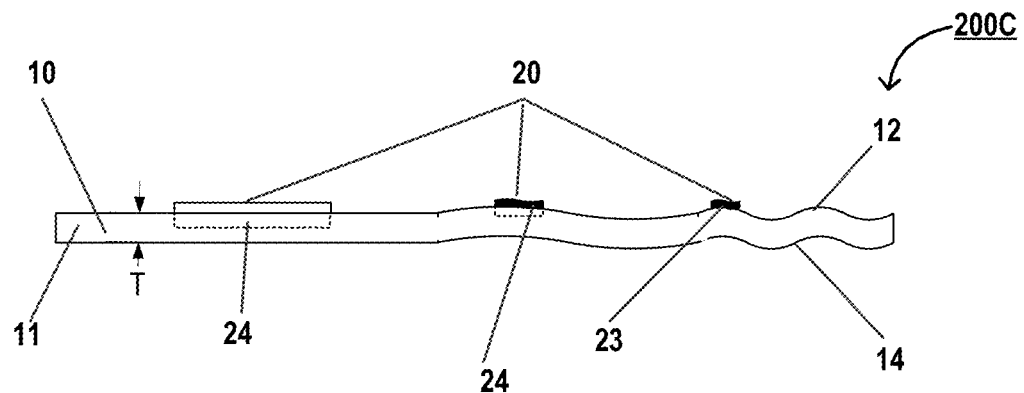
FIG. 2C illustrates a lateral view 200C of a paper based item 10, in accordance with an embodiment of the invention.
Figure 2D:
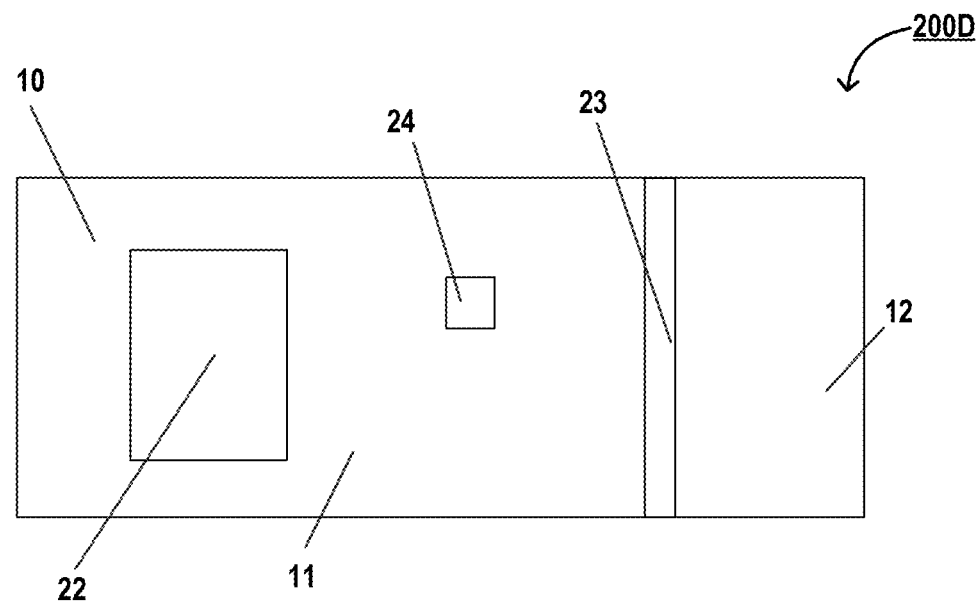
FIG. 2D illustrates a top view 200D of the paper based item 10 of FIG. 2C, in accordance with an embodiment of the invention.

FIGS. 2C and 2D depict an illustrative example of a paper resource item 10, in accordance to one embodiments of the invention. Specifically, FIG. 2C illustrates a lateral view 200C of a paper resource item 10 (i.e., also referred to as a paper based item), in accordance with an embodiment of the invention. FIG. 2D illustrates a top view 200D of the paper resource item 10 of FIG. 2C, in accordance with an embodiment of the invention. It is noted that the dimensions and contour of the paper resource 10 are depicted in an exaggerated manner for illustration purposes.

As illustrated, the paper resource item 10 comprises an elongate planar body structure 11 (also referred to as a "elongate body structure 11" or "body 11") defining a first surface 12, an opposing second surface 14, and a thickness "T" therebetween. Typically, the first surface 12 and the second surface 14 are substantially parallel to each other and separated by the thickness T. In some embodiments, the thickness T may be in the range of about 0.1 mm-0.4 mm, 0.1-0.2 mm, 0.1 mm-0.5 mm, 0.05 mm-0.2 mm, 0.01 mm-0.3 mm, and/or in between or overlapping these ranges. As discussed earlier, although termed as a "paper resource item" or a "paper based item," it is understood that these paper resource items may be manufactured from a suitable paper, paper pulp, plastics, polymers, textile materials, composites, organic materials, inorganic materials, metals, alloys, or a suitable combination of the foregoing that are structured to provide predetermined properties to the elongate planar body structure 11, such as flexibility, foldability, lower weight, low thickness, and/or the like. In some embodiments, the elongate planar body structure 11 is manufactured from cotton paper material (e.g., having a weight of 75 grams-95 grams per square meter with 75% cotton and 25% linen by weight). Here, the cotton paper material may comprise cotton, linen, abaca, textile fibers, and/or the like. As discussed, in some embodiments, the elongate planar body structure 11 is a currency bill.

Moreover, the paper resource item 10 comprises one or more physical state sensing components 20 (e.g., at least one first physical state sensing components 22 of a first type, at least one second physical state sensing component 23 of a second type, and/or at least one third physical state sensing component 24 of a third type, described in detail below) provided at the elongate planar body structure 11. Typically, each of the one or more physical state sensing components 20 are structured to be scanned/inspected by the scanning device for determining a fitness state of the first paper resource item. As discussed, the fitness state of the first paper resource item typically comprises at least (i) a first item wear level and (ii) a first item age level.

In some embodiments, the physical state sensing component 20 takes the form of a film coating 22 (also referred to as a film type physical state sensing component, or "erosion-sensitive component" or "erosion-sensitive film") applied on or otherwise affixed to at least a portion of the first surface 12 (and/or the second surface 14) of the elongate planar body structure 11 over a film area. The film coating 22 may be applied on or otherwise affixed to at least a portion of the first surface 12 (and/or the second surface 14) by the processing system 120, e.g., via a coating device of the processing system 120, in some embodiments. The film coating 22 may itself comprise a film thickness (different from thickness T of the elongate planar body structure 11).

In some embodiments, the film coating 22 is a transparent coating, while in other embodiments, the coating may be translucent, colored, opaque, etc. Moreover, the film coating 22 may lay on the first surface 12 of the elongate planar body structure 11 in some embodiments, while in other embodiments, the film coating 22 may penetrate into at least a portion of the thickness T on the first surface 12 (e.g., as illustrated by FIG. 2C). The film coating 22 may be a plastic film coating, a metal foil coating, a polymer coating, a material deposit type coating, and/or the like.

Typically, the film coating 22 (also referred to as an "erosion-sensitive component" or "erosion-sensitive film") is structured to undergo material loss, e.g., in the form of gradual deterioration, deformation, peeling, scratching, pilling, loss of material at areas at or proximate folds, fragmentation, etc., upon repeated use of the paper resource item 10 over time due to abrasion, friction, erosion, folding, creasing, twisting, bending, wrinkling, crumpling, tearing, etc., of the item 10 during use. This progressive material loss is referred to as a mechanical wear rate, and may be further defined as reduction in film area and reduction in film thickness of the film coating 22 of a particular paper resource item (e.g., a used paper resource item that has been subject to wear) in comparison with a predetermined film area and a predetermined film thickness that is associated with a newly manufactured unused paper resource item (e.g., a new paper resource item constructed by the system 120 by applying the film coating 22). In some instances, the mechanical wear rate is a measure of reduction in film area and reduction in film thickness of the film coating 22 of a particular paper resource item in comparison with a predetermined film area and a predetermined film thickness that is associated with a newly manufactured unused paper resource item, per unit time (determined based on the lifespan of the particular paper resource item being scanned). It is noted that, typically, the mechanical wear rate of the film coating 22 is less than a mechanical wear rate of the first surface 12 to which it is applied on. In other words, the film coating 22 is structured to undergo material loss or deteriorate at a faster rate than elongate planar body structure 11. In some instances, the material loss of the elongate planar body structure 11 may be minimal or negligible, even though at least 30%, or even 50% of the film area and/or film thickness is lost during prolonged use.

In some embodiments, the film coating 22 is light reflective, such that when scanned by the scanning device 250 (as previously described with respect to FIG. 2B), the film coating 22 reflects a predetermined portion of the light incident upon it. Upon scanning using the scanning device 150, as described later on with respect to block 504 of FIG. 5, the system 120 may measure the reflected light intensity, and correlate the reflected light with material loss, by at least comparing the determined reflected light with a predetermined reflected light of a newly manufactured item. In some instances, the light reflective film coating 22 (e.g., a shiny surface) is applied on comparatively a light absorbing first surface 12 (e.g., dull surface) in order to increase the accuracy of the measurement of the reflected light. Here, when the material of the light reflective film coating 22 is lost, the light absorbing first surface 12 is revealed underneath, thereby causing a decrease in intensity of reflective light as the wear of the item 10 progresses. The system may determine the item wear level corresponding to the material wear rate/material loss: a first wear level for a newly manufactured item to comprise, i.e., 0% wear or material loss, a second wear level for items having 1% to 5% wear rate or material loss, a third wear level for items having 6% to 10% wear rate or material, and so on, with ascending wear levels corresponding to progressively increasing wear rate (e.g., in increments of 4%, 5%, 2%, 10%, 20%, etc.). In this way, the system 120 may determine the item wear level of the item 10.

Alternatively, the film coating 22 may be light absorbing, such that when scanned by the scanning device 250 (as previously described with respect to FIG. 2B), the film coating 22 absorbs a predetermined portion of the light incident upon it. Upon scanning using the scanning device 150, as described later on with respect to block 504 of FIG. 5, the system 120 may measure the reflected light intensity, and correlate the reflected light with material loss, by at least comparing the determined reflected light with a predetermined reflected light of a newly manufactured item. Here, in some instances, the light absorbing film coating 22 (e.g., a black colored or another dark colored coating) is applied on comparatively a light reflective first surface 12 (e.g., a white surface) in order to increase the accuracy of the measurement of the reflected light. Here, when the material of the light absorbing film coating 22 is lost, the light reflective first surface 12 is revealed underneath, thereby causing an increase in intensity of reflective light as the wear of the item 10 progresses. The system may determine the item wear level corresponding to the material wear rate/material loss: a first wear level for a newly manufactured item to comprise, i.e., 0% wear or material loss, a second wear level for items having 1% to 5% wear rate or material loss, a third wear level for items having 6% to 10% wear rate or material, and so on, with ascending wear levels corresponding to progressively increasing wear rate (e.g., in increments of 4%, 5%, 2%, 10%, 20%, etc.). In this way, the system 120 may determine the item wear level of the item 10.

In some embodiments, the physical state sensing component 20 takes the form of an age-sensitive dye 23 (also referred to as a dye type physical state sensing component, or "age tracking component") applied on, embedded within, dispersed within, or otherwise affixed to at least a portion of the first surface 12 (and/or the second surface 14) of the elongate planar body structure 11 over a dye area, by the processing system 120, e.g., via a coating device of the processing system 120, in some embodiments. Moreover, the age-sensitive dye 23 may lay on the first surface 12 of the elongate planar body structure 11 in some embodiments, while in other embodiments, the age-sensitive dye 23 may penetrate into or dispersed within at least a portion of the thickness T on the first surface 12. The age-sensitive dye 23 may be in the form of pain, ink, dye particles, Nanoparticles, etc.

Typically, the age-sensitive dye 23 is structured to automatically undergo a change in color, e.g., in the form of gradual color transformation, upon repeated use of the paper resource item 10 over time due to aging of the item 10. The age-sensitive dye 23 of a particular paper resource item (e.g., a used paper resource item that has been is use for a period of time) may exhibit a second color (e.g., yellow) in comparison with a first color (e.g., red) that is associated with a newly manufactured unused paper resource item (e.g., a new paper resource item constructed by the system 120 by applying the age-sensitive dye 23). Moreover, the age-sensitive dye 23 a newly manufacture item may exhibit a first color (e.g., blue) thus having a first age level, the age-sensitive dye 23 of an item of an intermediate age (e.g., 5 years) may exhibit a second color (e.g., green) thus having a second or intermediate age level, the age-sensitive dye 23 of an item of older age (e.g., 15 years) may exhibit a third color (e.g., yellow) thus having a third age level, and so on.

The system 120 may correlate the determined color with the predetermined colors for various age levels to determine the item age level. Here, the scanner 250 is typically configured to identify the hue (dominant wavelength), value (quantity of light reflected relating to lightness or darkness) and saturation (tint, tone, shade, etc.) of the color exhibited by the age-sensitive dye 23 and hence determine the item age level. It is noted that, in some instances, a first color as used herein may comprise (i) a different hue, (ii) a different value, and/or (iii) a different saturation, in comparison with a second color. In this way, the system 120 may determine the item age level of the item 10.

In some embodiments, the physical state sensing component 20 takes the form of a microchip 24 applied on, embedded within, or otherwise affixed to at least a portion of the first surface 12 (and/or the second surface 14) of the elongate planar body structure 11. Typically, the microchip 24 may comprise at least a semiconductor based strain gauge, and a memory. The string gauge is configured to exhibit variation in the electricity generated based on the wear applied to the item 10 (folding, bending, etc.) which may be sensed by the microchip's microprocessor. This incremental wear may be stored in the memory along with periodic updates of the age of the item, which may be scanned by the scanner 250 to determine the item wear level and item age level.

It is noted that, although illustrated and described as separate components, the physical state sensing components 20, i.e., the film coating 22, the age-sensitive dye 23 and/or the microchip 24 maybe provided as a single physical state sensing component 20.

The paper resource item 10 may further comprise a unique identifier, e.g., printed upon the first surface 12 or stored in the microchip 24, which may then be scanned by the scanner 250.

Figure 3:
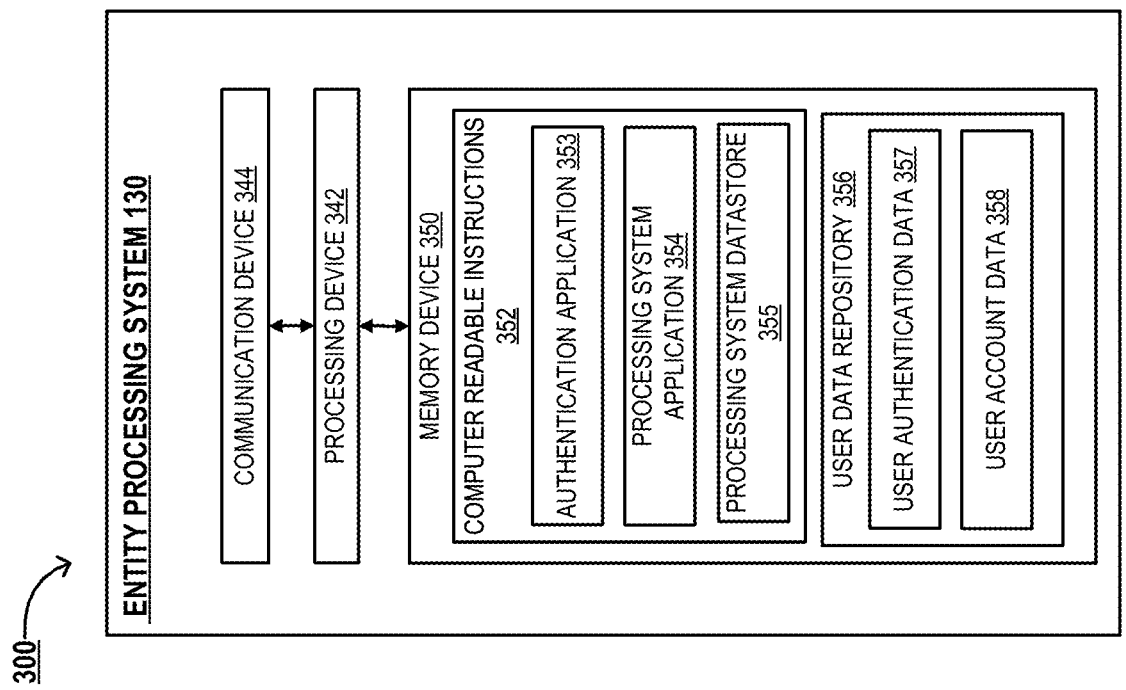
FIG. 3 illustrates a block diagram 300 of an entity processing system, in accordance with an embodiment of the invention.

FIG. 3 illustrates a block diagram 300 of the entity processing system 130, in accordance with some embodiments of the invention. As illustrated in FIG. 3, the entity processing system 130 may include a communication device 344, a processing device 342, and a memory device 350 having an authentication application/module 353, an entity processing system application 354 and an entity processing system datastore 355 stored therein. As shown, the processing device 342 is operatively connected to and is configured to control and cause the communication device 344, and the memory device 350 to perform one or more functions. Furthermore, in some instances, the processing device 342 may be configured to control and cause the processor 210 of the processing system 120 to perform one or more functions. In some embodiments, the authentication application 353 and/or the entity processing system application 354 comprises computer readable instructions that when executed by the processing device 342 cause the processing device 342 to perform one or more functions and/or transmit control instructions to the processing system 120, the authentication database 118, the item processing machine 116, and/or the communication device 344. It will be understood that the authentication application 353 and/or the entity processing system application 354 may be executable to initiate, perform, complete, and/or facilitate one or more portions of any embodiments described and/or contemplated herein, and specifically embodiments directed to user activities. The authentication application 353 may comprise executable instructions associated with one or more steps of wear and aging evaluation of paper-based items, and may be embodied within the entity processing system application 354 in some instances. In some embodiments, the authentication application 353 is similar to the authentication module 234 described previously.

The entity processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 120 and other entity processing systems, data systems, etc.

Additionally, referring to entity processing system 130 illustrated in FIG. 3, the processing device 342 may generally refer to a device or combination of devices having circuitry used for implementing the communication and/or logic functions of the entity processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the entity processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the entity processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the entity processing system, for example on one or more workstations connected to the system 130, the user device 104, or the display device 280 of the processing system 120. As another example, the user interface may be provided on the processing system 120 that may be controlled by the entity processing system 130 either directly or via the processor 210 of the processing system 120.

The memory device 350 within the entity processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The entity processing system 130 may be used by a third party/entity to interact with the processing system 120, based on providing requisite authorization. The entity processing system 130 may further comprise a user data repository 356 comprising user authentication data 357 and user account data 358. The entity processing system 130 may utilize the authentication data 357 to validate user authentication credentials. Furthermore, the account data 358 may reflect the current account data of the user.

Figure 4:
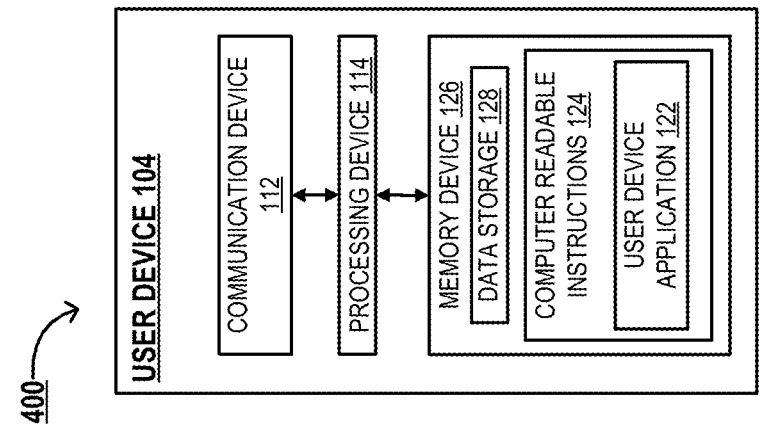
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, the computer system of the user processing system 120, or another device including, but not limited to portable digital assistants (PDAs), pagers, mobile televisions, laptop computers, cameras, video recorders, audio/video player, radio, GPS devices, any combination of the aforementioned devices.

The mobile device 104 may generally include a processing device or processor 114 communicably coupled to devices such as, a memory device 116, user output devices (not illustrated) (for example, a user display device, or a speaker), user input devices (such as a microphone, keypad, touchpad, touch screen, and the like), a communication device or network interface device 112, a power source (not illustrated), a visual capture device such as a camera (not illustrated), a positioning system device (not illustrated), one or more chips, and the like. The processor 114 may further include a central processing unit, input/output (I/O) port controllers, a graphics controller, a serial bus controller and a memory and local bus controller. The processor 114 may include functionality to operate one or more software programs or applications, which may be stored in the memory device 116. For example, the processor 114 may be capable of operating applications such as the user device application 122 and the associated computer readable instructions 124. The user device application 122 may then allow the mobile device 104 to transmit and receive data and instructions from the processing system 120 (for example, via wireless communication or NFC channels), data and instructions from the entity processing system 130, web content, such as, for example, location-based content and/or other web page content, according to a Wireless Application Protocol (WAP), Hypertext Transfer Protocol (HTTP), and/or the like.

Figure 5:
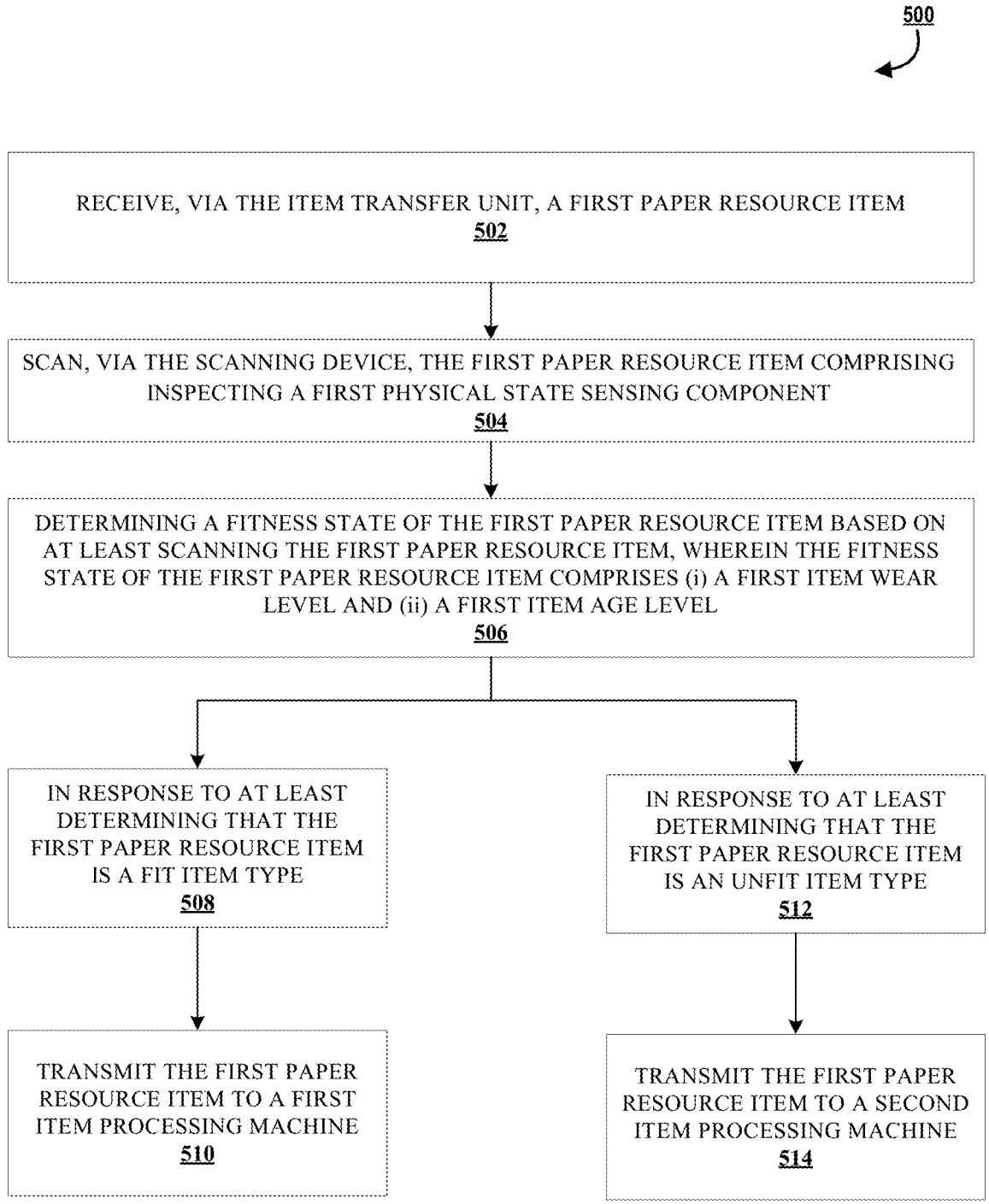
FIG. 5 illustrates a high level process flow 500 for wear and aging evaluation of a paper-based resources, in accordance with an embodiment of the invention.

FIG. 5 illustrates a high-level process flow 500 for wear and aging evaluation of a paper-based resource in accordance with one aspect of the present invention. As discussed, the invention is structured for determining a fitness state of a physical body structure of a paper resource item and for adaptive processing of the paper resource item in accordance with the fitness state. In some embodiments, the steps associated with the process flow 500 are performed by processing system 120. As discussed, the processing system 120 comprises an item transfer unit 262 configured to receive one or more paper resource items 10, and a scanning device 250 structured to retrieve a fitness state of a paper resource item from a physical state sensing component of the paper resource item. Moreover, the processing system 120 comprises at least one memory device 220, at least one communication device 270 connected to a distributed network 101, and at least one processing device 210 operatively coupled to the at least one memory device 220 and the at least one communication device 270. Typically, a module stored in the at least one memory device 220 comprises executable instructions associated with the process flow 510 that when executed by the at least one processing device 210, cause the at least one processing device 210 to perform one or more steps herein. It is noted that FIG. 5 is best understood in conjunction with the description provided with respect to FIGS. 2C-2D, previously.

Initially, at block 502, the system typically receives, via the item transfer unit, a first paper resource item (e.g., paper resource item 10 described with respect to FIGS. 2C-2D). As discussed, the first paper resource item comprises a first planar body structure defining a first surface, an opposing second surface, and a thickness therebetween. Moreover, the first paper resource item comprises a first physical state sensing component provided at the planar body structure.

As previously discussed with respect to FIGS. 2C-2D, in some embodiments, the first surface of the first paper resource item is associated with a first mechanical wear rate. Moreover, the first physical state sensing component of the first paper resource item may comprise an erosion-sensitive component associated with a second mechanical wear rate that is greater than the first mechanical wear rate, that is structured to be assessed to determine the item wear level. Here, the first physical state sensing component may be an erosion-sensitive film provided on the first surface of the first paper resource item. In some embodiments, the first physical state sensing component of the first paper resource item comprises an age tracking component that is structured to automatically change from a first color to a second color after a predetermined period of time, which is structured to indicate an item age level. As discussed, in some embodiments, the first paper resource item is a currency bill.

At block 504, the system may then scan the first paper resource item using the scanning device (e.g., scanning device 250). This typically involves inspecting the first physical state sensing component, as described with respect to FIGS. 2C-2D.

At block 506, the system then determines a fitness state of the first paper resource item based on at least scanning the first paper resource item. Typically, the fitness state of the first paper resource item comprises (i) a first item wear level and/or (ii) a first item age level.

Specifically, in the instances where first physical state sensing component of the first paper resource item comprises an erosion-sensitive component, determining the first item wear level comprises determining a current amount of the erosion-sensitive component, i.e., loss of material. Here, the system determines that the first item wear level of the first paper resource item is above a predetermined minimum wear threshold (e.g., a predetermined minimum wear threshold of 1% material loss/wear rate) based on determining that the current amount of the erosion-sensitive component is below a predetermined amount associated with the predetermined minimum wear threshold (e.g., the item being scanned having a 2% material loss/wear rate).

Moreover in the instances where the first physical state sensing component of the first paper resource item comprises an age tracking component that is structured to automatically change from a first color (e.g., red) to a second color (e.g., green) after a predetermined period of time, the system determines the first item age level of the first paper resource item by scanning a current color of the age tracking component, as described previously with respect to FIGS. 2C-2D. Here, determining that the first item age level of the first paper resource item is below the predetermined age threshold may comprise determining that the current color of the age tracking component is not the second color.

Next, in response to at least determining that (i) the first item wear level of the first paper resource item is above a predetermined minimum wear threshold, and (ii) the first item age level of the first paper resource item is below a predetermined age threshold, the system typically determines that the first paper resource item is a fit item type, as illustrated by block 508. For example, the system may determine that the paper resource item comprises (i) the item wear level corresponding to 3%-4% material loss/wear rate (of the physical state sensing component) above a predetermined minimum wear threshold of 0% or 1% wear rate corresponding to a newly manufactured item, and (ii) the age level corresponding to a first color (e.g., red of a measured hue) of physical state sensing component below a predetermined age threshold corresponding to a second color (e.g., yellow of a predetermined hue and saturation), and subsequently determine that the item is a fit item type. In addition, typically, determining that the first paper resource item is the fit item type further comprises determining that the first item wear level of the first paper resource item is below a predetermined maximum wear threshold. Continuing with the previous example, the system may determine that the paper resource item comprises (i) the item wear level corresponding to 3%-4% material loss/wear rate (of the physical state sensing component): ((i)(a)) above a predetermined minimum wear threshold of 1%, and ((i)(b)) and below a predetermined maximum wear threshold of 60%; and (ii) the age level corresponding to a first color (e.g., red of a measured hue) of physical state sensing component below a predetermined age threshold corresponding to a second color (e.g., yellow of a predetermined hue and saturation), and subsequently determine that the item is a fit item type. In this way the present invention is configured to determine the compatibility of the item with machines (e.g., first item processing machine described below) which require paper items that (i) have at least a certain amount of wear, because worn items tend to remain separate and do not tend to stick together, but also (ii) do not exhibit severe deterioration due to age and/or wear, because extremely worn/aged items may be un-processable, may fall-apart, etc.

Consequently, at block 510, the system transmits the first paper resource item to a first item processing machine, such as an ATM, in response to determining that the first paper resource item is the fit item type. Here, the first item processing machine is structured to receive an activity request from a user to withdraw one or more items. In response to authenticating the user, dispensing, via an item transfer component of the item processing machine, the first paper resource item to the user.

Moreover, the first item processing machine may construct a bundle comprising the first paper resource item and a third paper resource item based on determining that the second paper resource item is the fit item type. In other words, the first item processing machine may bundle together various fit type items.

In addition, the system may also determine a unique identifier associated with the first paper resource item using the scanning device. In response the system may construct a data record comprising the unique identifier associated with the first paper resource item and the determined fitness state, thereby constructing a real-time data base of item fitness information.

Alternatively, the system may receive, via the item transfer unit, a second paper resource item. The system may similarly determine the fitness state of the second paper resource item comprising a second item wear level and a second item age level. Consequently, at block 512, in response to determining at least one of (i) a second item wear level of the second paper resource item being above the predetermined maximum wear threshold, and (ii) the second item age level of the second paper resource item being above the predetermined age threshold, the system may determine that the second paper resource item is a unfit item type.

In response, as indicated by block 514, the system typically transmits the second paper resource item to a second item processing machine in response to determining that the first paper resource item is the unfit item type. Here the second item processing machine may initiate removal of the second paper resource item from circulation (e.g., by transmitting the item to a secure disposal box, dyeing the item to indicate its unfitness for use, etc.), and/or perform other actions.

In some embodiments, the system may modify the fitness state of the first paper resource item to indicate a processing operation, Here, using an engraving component, the system may perform a physical tactile operation on the first physical state sensing component comprising removing a predetermined about of the material of the physical state sensing component to cause material loss/increase in wear rate, so that subsequent scans would indicate the item's use. Here, the physical tactile operation may comprise at least one of (i) a material removal operation (e.g., etching the item until the base surface of the elongate body is revealed, peeling layers of the material, etc.), or (ii) a material distortion operation (e.g., moving the material from the file area into other areas on the first surface of the elongate body). Typically, performing the physical tactile operation on the first physical state sensing component of the first paper resource item is structured to cause an increase in the first item wear level, which can be sensed during subsequent scans and wear can be identified.

In some embodiments, the system is configured to construct a paper resource item. Here, the system may retrieve a second planar body comprising having a first surface, an opposing second surface, and a thickness therebetween. The system may then secure a second physical state sensing component with the planar body (i) at the first surface of the second planar body or (ii) at least partially embedded in the planar body, as illustrated by FIGS. 2C-2D.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for wear and aging evaluation of a paper-based resource, wherein the system is structured for determining a fitness state of a physical body structure of a paper resource item and for adaptive processing of the paper resource item in accordance with the fitness state, the system comprising:
   an item transfer unit configured to receive one or more paper resource items;
   a scanning device structured to retrieve a fitness state of a paper resource item from a physical state sensing component of the paper resource item;
   at least one memory device;
   at least one communication device connected to a distributed network;
   at least one processing device operatively coupled to the at least one memory device and the at least one communication device; and
   a module stored in the at least one memory device comprising executable instructions that when executed by the at least one processing device, cause the at least one processing device to:
      receive, via the item transfer unit, a first paper resource item, wherein the first paper resource item comprises:
         a first elongate body structure defining a first surface, an opposing second surface, and a thickness therebetween, wherein the first surface of the first paper resource item is associated with a first mechanical wear rate; and a first physical state sensing component provided at the first elongate body structure, wherein the first physical state sensing component of the first paper resource item comprises an erosion-sensitive component associated with a second mechanical wear rate that is greater than the first mechanical wear rate;

scan, via the scanning device, the first paper resource item, wherein scanning the first paper resource item comprises inspecting the first physical state sensing component;

determine a fitness state of the first paper resource item based on at least scanning the first paper resource item, wherein the fitness state of the first paper resource item comprises (i) a first item wear level and (ii) a first item age level, wherein determining the first item wear level comprises determining a material loss of the erosion-sensitive component;

in response to at least determining that (i) the first item wear level of the first paper resource item is above a predetermined minimum wear threshold, and (ii) the first item age level of the first paper resource item is below a predetermined age threshold, determine that the first paper resource item is a fit item type; and transmit the first paper resource item to an item processing machine in response to determining that the first paper resource item is the fit item type.

2. The system of claim 1, wherein determining that the first paper resource item is the fit item type further comprises determining that the first item wear level of the first paper resource item is below a predetermined maximum wear threshold.

3. The system of claim 1, wherein determining the first item wear level comprises determining a current amount of the erosion-sensitive component, wherein determining that the first item wear level of the first paper resource item is above a predetermined minimum wear threshold comprises determining that the current amount of the erosion-sensitive component is below a predetermined amount associated with the predetermined minimum wear threshold.

4. The system of claim 1, wherein the first physical state sensing component of the first paper resource item comprises an erosion-sensitive film provided on the first surface of the first paper resource item.

5. The system of claim 1, wherein the first physical state sensing component of the first paper resource item comprises an age tracking component that is structured to automatically change from a first color to a second color after a predetermined period of time, wherein determining the first item age level of the first paper resource item comprises scanning a current color of the age tracking component, wherein determining that the first item age level of the first paper resource item is below the predetermined age threshold comprises determining that the current color of the age tracking component is not the second color.

6. The system of claim 1, the module further comprises instructions that cause the at least one processing device to construct a second paper resource item, wherein constructing the second paper resource item comprises:

retrieving a second elongate body structure comprising a first surface, an opposing second surface, and a thickness therebetween; and securing a second physical state sensing component with the second elongate body structure (i) at the first surface of the second elongate body structure or (ii) at least partially embedded in the second elongate body structure.

7. The system of claim 1, the module further comprises instructions that cause the at least one processing device to:

determine, via the scanning device, a unique identifier associated with the first paper resource item; and construct a data record comprising the unique identifier associated with the first paper resource item and the determined fitness state.

8. The system of claim 1, wherein the predetermined minimum wear threshold is associated with a predetermined newly manufactured paper resource item.

9. The system of claim 1, the module further comprises instructions that cause the at least one processing device to:

modify the fitness state of the first paper resource item to indicate a processing operation, wherein modifying the fitness state comprises performing, via an engraving component, a physical tactile operation on the first physical state sensing component, wherein the physical tactile operation is at least one of (i) a material removal operation, or (ii) a material distortion operation; and wherein performing the physical tactile operation on the first physical state sensing component of the of the first paper resource item causes an increase in the first item wear level.

10. The system of claim 1, the module further comprises instructions that cause the at least one processing device to:

receive, via the item transfer unit, a second paper resource item;

determining the fitness state of the second paper resource item comprising a second item wear level and a second item age level;

in response to determining at least one of (i) a second item wear level of the second paper resource item being above a predetermined maximum wear threshold, and (ii) the second item age level of the second paper resource item being above the predetermined age threshold, determine that the second paper resource item is a unfit item type; and in response to determining that the second paper resource item is the fit item type, initiate removal of the second paper resource item from circulation.

11. The system of claim 1, wherein the first paper resource item is a currency bill.

12. The system of claim 1, wherein the item processing machine is structured to:

dispense, via an item transfer component of the item processing machine, the first paper resource item.

13. The system of claim 1, wherein the module further comprises instructions that cause the at least one processing device to construct a bundle comprising the first paper resource item and a second paper resource item based on determining that the second paper resource item is the fit item type.

14. A computer program product for wear and aging evaluation of a paper-based resource, whereby the computer program product is structured for determining a fitness state of a physical body structure of a paper resource item and for adaptive processing of the paper resource item in accordance with the fitness state, the computer program product comprising a non-transitory computer-readable storage medium having computer-executable instructions to:

receive, via an item transfer unit, a first paper resource item, wherein the first paper resource item comprises:

a first elongate body structure defining a first surface, an opposing second surface, and a thickness therebetween, wherein the first surface of the first paper resource item is associated with a first mechanical wear rate; and a first physical state sensing component provided at the first elongate body structure, wherein the first physical state sensing component of the first paper resource item comprises an erosion-sensitive component associated with a second mechanical wear rate that is greater than the first mechanical wear rate;

scan, via a scanning device, the first paper resource item, wherein scanning the first paper resource item comprises inspecting the first physical state sensing component;

determine a fitness state of the first paper resource item based on at least scanning the first paper resource item, wherein the fitness state of the first paper resource item comprises (i) a first item wear level and (ii) a first item age level, wherein determining the first item wear level comprises determining a material loss of the erosion-sensitive component;

in response to at least determining that (i) the first item wear level of the first paper resource item is above a predetermined minimum wear threshold, and (ii) the first item age level of the first paper resource item is below a predetermined age threshold, determine that the first paper resource item is a fit item type; and transmit the first paper resource item to an item processing machine in response to determining that the first paper resource item is the fit item type.

15. The computer program product of claim 14, wherein determining that the first paper resource item is the fit item type further comprises determining that the first item wear level of the first paper resource item is below a predetermined maximum wear threshold.

16. The computer program product of claim 14, wherein the non-transitory computer-readable storage medium further comprises computer-executable instructions to construct a second paper resource item, wherein constructing the second paper resource item comprises:

retrieving a second planar body comprising having a first surface, an opposing second surface, and a thickness therebetween; and securing a second physical state sensing component with the second planar body (i) at the first surface of the second planar body or (ii) at least partially embedded in the second planar body.

17. A computerized method for wear and aging evaluation of a paper-based resource, whereby the computerized method is structured for determining a fitness state of a physical body structure of a paper resource item and for adaptive processing of the paper resource item in accordance with the fitness state, the computerized method comprising:

receiving, via an item transfer unit, a first paper resource item, wherein the first paper resource item comprises:
a first elongate body structure defining a first surface, an opposing second surface, and a thickness therebetween, wherein the first surface of the first paper resource item is associated with a first mechanical wear rate; and
a first physical state sensing component provided at the first elongate body structure, wherein the first physical state sensing component of the first paper resource item comprises an erosion-sensitive component associated with a second mechanical wear rate that is greater than the first mechanical wear rate;

scanning, via a scanning device, the first paper resource item, wherein scanning the first paper resource item comprises inspecting the first physical state sensing component;

determining a fitness state of the first paper resource item based on at least scanning the first paper resource item, wherein the fitness state of the first paper resource item comprises (i) a first item wear level and (ii) a first item age level, wherein determining the first item wear level comprises determining a material loss of the erosion-sensitive component;

in response to at least determining that (i) the first item wear level of the first paper resource item is above a predetermined minimum wear threshold, and (ii) the first item age level of the first paper resource item is below a predetermined age threshold, determining that the first paper resource item is a fit item type; and transmitting the first paper resource item to an item processing machine in response to determining that the first paper resource item is the fit item type.

18. The computerized method of claim 17, wherein determining that the first paper resource item is the fit item type further comprises determining that the first item wear level of the first paper resource item is below a predetermined maximum wear threshold.

* * * * *